Figure 1:
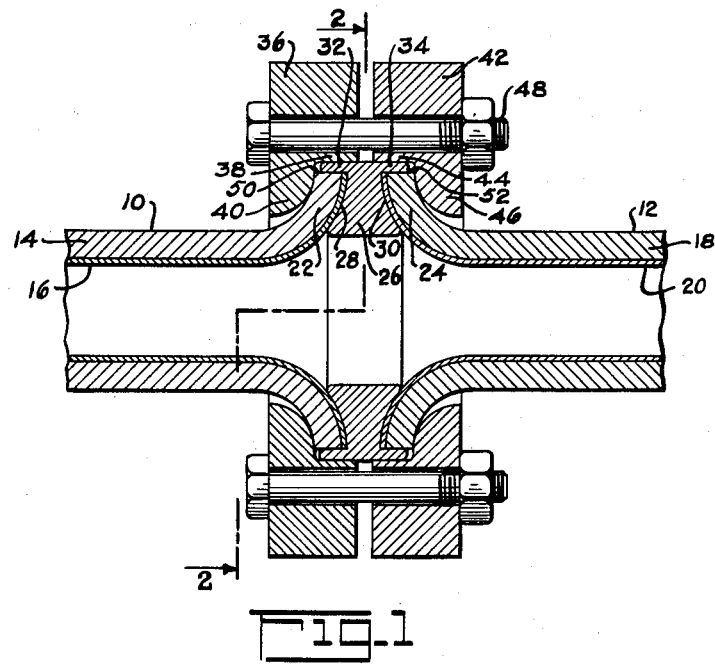

Jan. 5, 1960       R. T. HURLEY       2,919,936
METALLIC LINED PIPE COUPLING HAVING A METALLIC SEAL
Filed Jan. 3, 1956

INVENTOR.
ROY T. HURLEY
BY Victor D. Behn
ATTORNEY

United States Patent Office 2,919,936
Patented Jan. 5, 1960

2,919,936

METALLIC LINED PIPE COUPLING HAVING A METALLIC SEAL

Roy T. Hurley, Saddle River, N.J., assignor to Curtiss-Wright Corporation, a corporation of Delaware Application January 3, 1956, Serial No. 557,048

1 Claim. (Cl. 285—55)

This invention relates to a coupling construction for pipes and tubing and is particularly directed to a coupling construction for clad pipes or tubing having a protective inner liner.

For reasons of economy pipes or tubing for use in transporting high temperature and/or corrosive fluids may be clad with an inner liner of relatively expensive protective material, such as stainless steel, rather than making the entire tube of said material. In coupling such pipes together it is essential that means be provided for protecting the end surfaces of the pipes at the coupling from possible contact with the fluid to be transported by said pipes. An object of the present invention comprises the provision of a novel and simple coupling construction for clad pipes such that the adjacent end surfaces of the coupled pipes are protected from contact with the fluid to be transported by the pipes.

Figure 2:
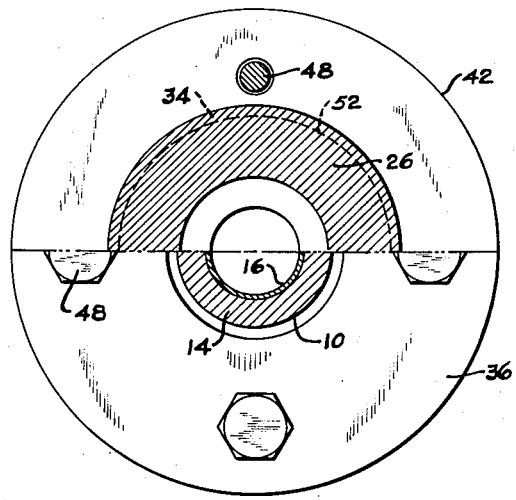

Other objects of the invention will become apparent upon reading the annexed detailed description in connection with the drawing in which:

Fig. 1 is an axial sectional view through a pipe coupling construction embodying the invention; and Fig. 2 is a transverse view taken along line 2—2 of Fig. 1.

Referring to the drawing, a pipe 10 is shown as having an end co-axially coupled to an end of a pipe 12. The pipe 10 comprises a base tube portion 14 having a relatively thin protective inner metallic liner 16 preferably bonded to said base portion. Similarly the pipe 12 may comprise a base tube portion 18 with a relatively thin protective inner liner 20. The material of the base tube portions of said pipes may be a mild steel while their protective liners are made of a stainless steel. Obviously, however, other materials may be used for said pipe base and liner portions. Copending patent application Serial No. 549,348 filed November 28, 1955, now abandoned, discloses a method of fabricating such clad pipes.

The two ends to be coupled together of the pipes 10 and 12 are flared outwardly as indicated at 22 and 24 respectively such that in axial section, the inner surface of each flared pipe end is convex and merges smoothly with the adjacent inner surface of its pipe. An annular metallic gasket 26 is disposed between the axially alined ends of the pipes 10 and 12, said gasket preferably being of the same material as that of the protective liners 16 and 20 respectively.

The two end surfaces 28 and 30 of the inner portion of the gasket 26 disposed adjacent to the flared ends 22 and 24 respectively of the pipes each have a concave curvature to fit said flared end. The outer portion of the gasket 26 is provided with opposite axially-extending flanges 32 and 34 which overlie the adjacent ends of the flared pipe ends 22 and 24 to help center the gasket.

A clamping ring 36 is disposed about the pipe 10, said ring 36 having a cylindrical portion 38 adapted to fit over the gasket flange 32 to center said ring 36. In addition the ring 36 has an inwardly extending annular flange 40 having an annular surface adapted to engage the outer surface of the flared pipe end 22. Said annular flange surface is convex in axial planes and the surface of the flared pipe end engaged thereby is concave in axial planes. Preferably the curvature of said flange surface along the annular region of contact with the flared pipe end 22 is substantially greater than the curvature of said flared pipe end along said region. A similar ring 42 is disposed about the pipe 12, the ring 42 having a cylindrical portion 44 sized to fit over the gasket flange 34 to center the ring. Also, like the ring 36, the ring 42 has an inwardly extending annular flange 46 having a convex annular surface adapted to engage the concave outer surface of the flared pipe end 24 with the curvature of said convex surface being substantially greater than that of said concave surface along their region of contact.

The clamping rings 36 and 42 are arranged to be drawn together for example by bolts 48 so that their flanges 40 and 46 engage the flared pipe ends 22 and 24 to clamp said flared ends against the gasket 26. The flared pipe ends 22 and 24 are drawn sufficiently tight against the gasket 26 to provide a sealed connection therebetween which prevents the fluid transported through the pipes from coming into contact with the otherwise unprotected end surfaces 50 and 52 of the base portions 14 and 18 of the pipes. With the curvature of the convex surface of each flange 40 and 46 being substantially greater than the curvature of the surface of the flared pipe end engaged thereby, the annular region of contact of said surfaces is quite narrow and approaches line contact whereby the major portion of the clamping pressure between the flared pipe ends and the gasket 26 is confined to a narrower annular area than it would be if said region of contact were wider, for example as would be the case if said curvatures were substantially the same. This concentration of the clamping pressure makes the seal between the gasket 26 and the flared pipe ends more effective.

The clamping rings 36 and 42 have been illustrated as having a one piece construction. With such construction they must be assembled about their respective pipes prior to flaring the ends of said pipes. Obviously, however, for reasons of assembly each of the rings 36 and 42 may comprise a plurality of circumferential sections disposed in end-to-end relation to form a complete ring.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

A pipe coupling construction comprising a pair of metallic pipes each having a relatively thin protective inner metallic liner bonded thereto, the adjacent ends of said pipes being axially alined and said pipe ends with their liners being flared outwardly such that both the inner and outer diameters of each said flared pipe end progressively increases toward said end and such that each said flared pipe end has a smooth curvature the inner surface of which is convex as viewed from a point beyond said pipe end and the outer surface of which is concave as viewed from the opposite side of said flared pipe end; an annular metallic gasket having an annular intermediate portion disposed between and engaging the adjacent flared ends of said pipes with the axial end surfaces of said gasket portion having a smooth concave profile shaped to fit the flared inner liner surfaces of said pipe ends, said gasket also having a pair of oppositely extending annular flanges closely overlying the adjacent flared ends of said pipes for co-axially aligning said pipe ends and gasket; a pair of clamping rings one for and disposed about each of said pipes, each of said rings having a convex first surface portion adapted to engage the radially outer end portion of the concave outer surface of the flared end of its pipe in an annular region axially opposite to the annular region on the inner surface of said flared end engaged by said annular gasket, the general convex curvature of each said ring surface portion being greater than that of the outer surface of the flared pipe end engaged thereby to provide an annular zone of relatively high contact pressure between each flared pipe end and the smoothly fitting gasket surface which pressure gradually falls off from said zone, each of said clamping rings having a second annular surface portion closely overlying the adjacent gasket annular flange for centering the clamping rings on said gasket; and means for drawing said rings toward each other against said flared pipe ends to clamp said flared pipe ends against said gasket intermediate portion to provide a seal therebetween.

References Cited in the file of this patent

UNITED STATES PATENTS

| | | |
|---|---|---|
| 660,862 | Lovekin | Oct. 30, 1900 |
| 969,423 | Tanner et al. | Sept. 6, 1910 |
| 1,179,091 | Gray et al. | Apr. 11, 1916 |
| 1,443,051 | Steindorf | Jan. 23, 1923 |
| 1,855,494 | Sorensen | Apr. 26, 1932 |
| 2,065,480 | Soper | Dec. 22, 1936 |
| 2,271,425 | Harris | Jan. 27, 1942 |
| 2,695,184 | Hobbs | Nov. 23, 1954 |

FOREIGN PATENTS

| | | |
|---|---|---|
| 165,925 | Great Britain | June 27, 1921 |
| 883,048 | France | June 22, 1943 |